Patented Mar. 16, 1926.

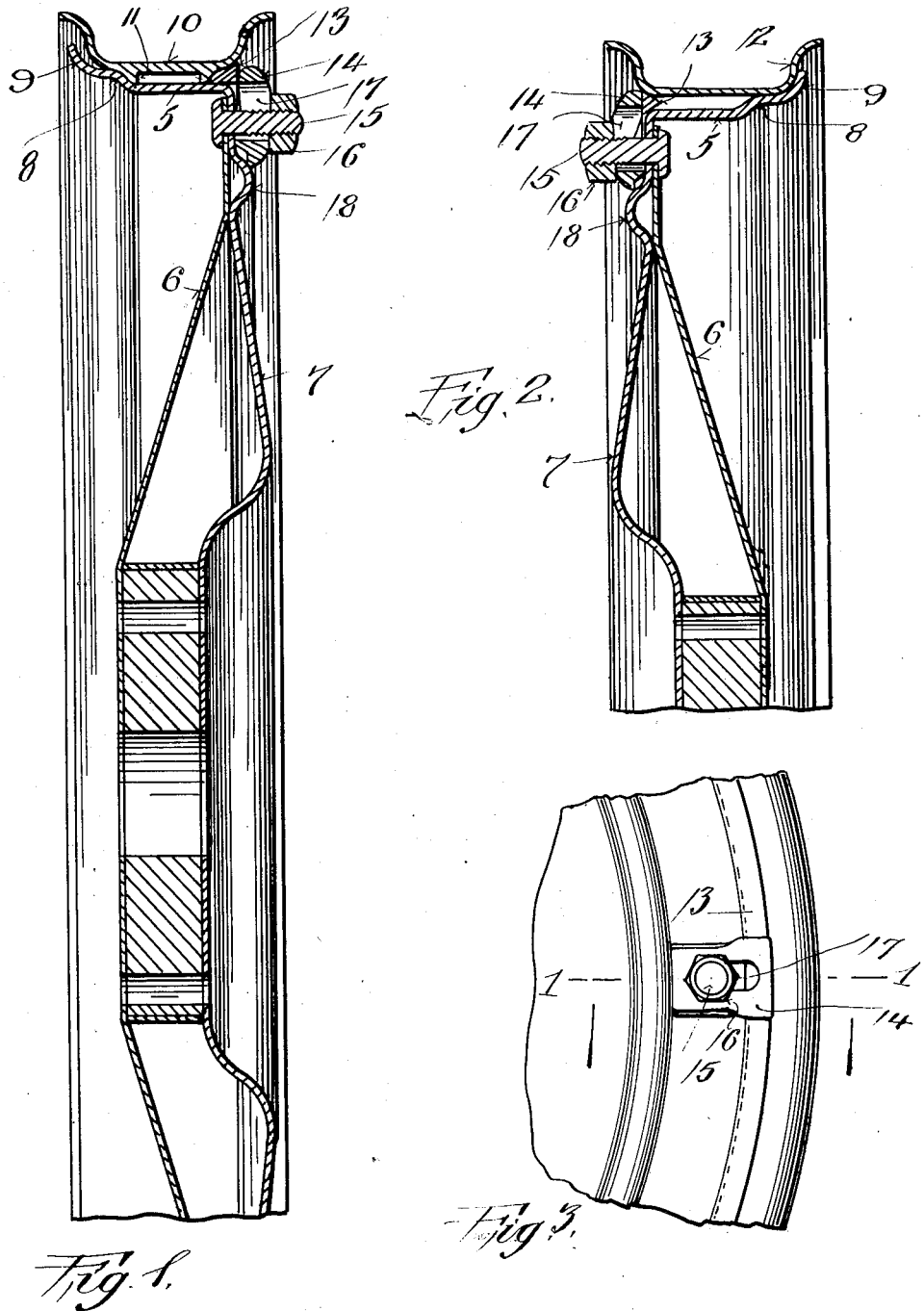

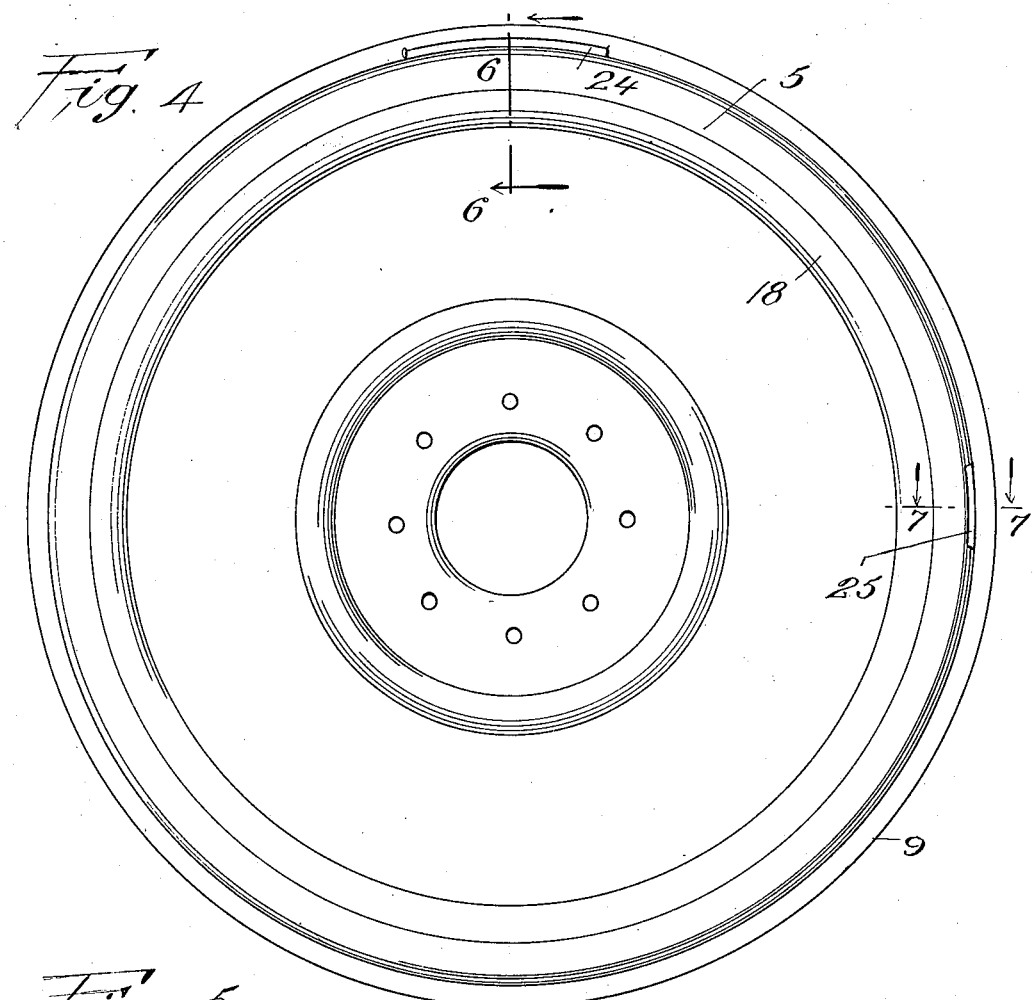
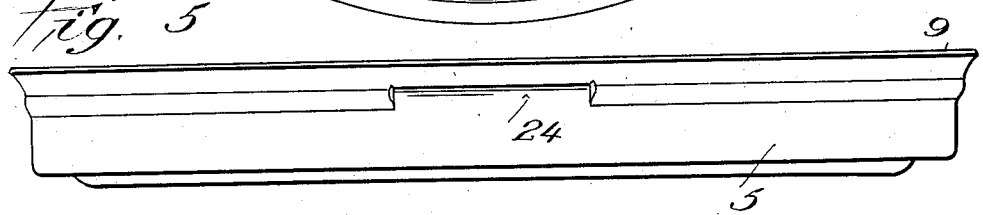
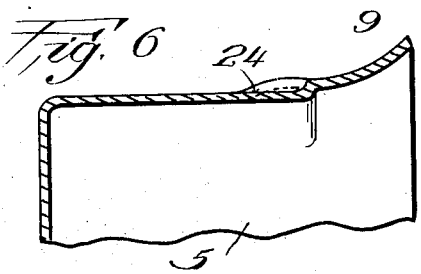

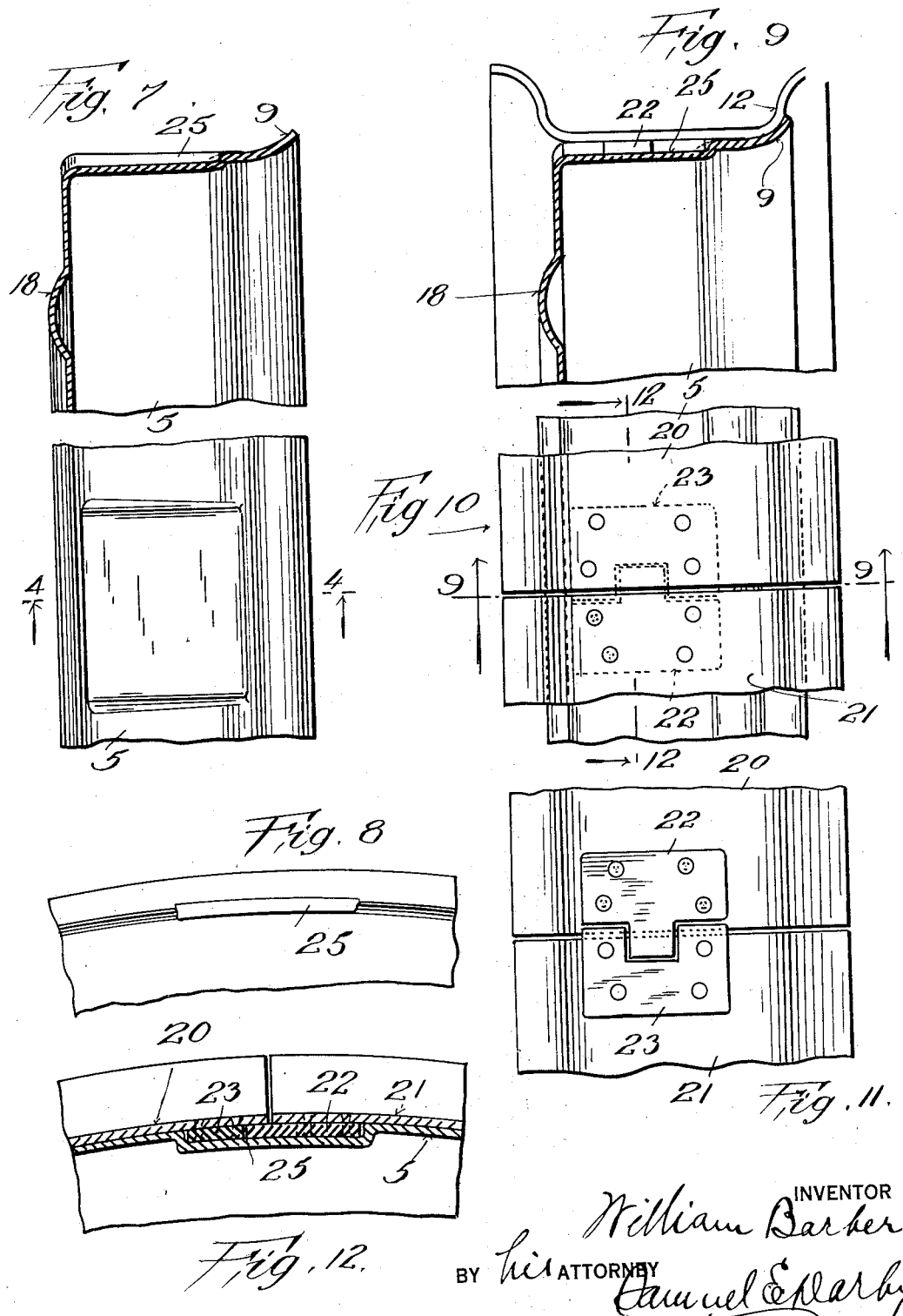

1,577,158

UNITED STATES PATENT OFFICE.

WILLIAM BARBER, OF NEW YORK, N. Y.

DEMOUNTABLE RIM STRUCTURE FOR WHEELS.

Application filed March 22, 1921. Serial No. 454,396.

*To all whom it may concern:*

Be it known that I, WILLIAM BARBER, a citizen of the United States, residing in the city of New York, county of Kings, State of New York, have made a certain new and useful invention in Demountable Rim Structures for Wheels, of which the following is a specification.

This invention relates to fixed structures for wheels. It includes subject-matter divided from my application Serial No. 369,461, filed March 29, 1920 and is a continuation in part of said application.

The object of the invention is to provide a structure which is simple, economical to manufacture, and efficient, for demountably securing tire rims of various standard types upon the same wheel.

A further object is to provide a fixed rim structure for wheels which is universal in its adaptation to accommodate various standard types of demountable tire rims at present in use.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the drawing,

Fig. 1 is a view in section, on the line 1, 1, Fig. 3, through a portion of a wheel showing a form of demountable rim structure embodying the principles of my invention.

Fig. 2 is a similar view showing another form or type of demountable wheel rim adapted to the rim mounting of my invention.

Fig. 3 is a broken view in side elevation showing the clip for clamping the rim retaining rim.

Fig. 4 is a view in side elevation of a wheel with the tire rim removed therefrom, and embodying in its fixed rim structure the principles of my invention.

Fig. 5 is a top plan or edge view of the same.

Fig. 6 is a broken view in section on the line 6, 6, Fig. 4.

Fig. 7 is a similar view on the line 7, 7, Fig. 4.

Fig. 8 is a broken detail view in side elevation of a portion of the fixed rim portion of a wheel constructed in accordance with my invention.

Fig. 9 is a broken view in section through the fixed rim showing the application of a tire rim thereto in accordance with my invention, the section being on the line 9, 9, Fig. 10.

Fig. 10 is a broken view in plan showing a portion of the tire rim at the meeting ends thereof, and applied to a fixed rim.

Fig. 11 is a broken view in inside plan of the meeting ends of a tire rim or band, showing one form of interlocking lugs ordinarily employed in connection with tire rims.

Fig. 12 is a broken view in section on the line 12, 12, Fig. 10.

Various standard forms or types of demountable rims are at present in general use for automobile or other wheels, but, so far as I am aware, each type of rim requires its own special form of fixed rim upon which it may be demountably mounted and secured. This practice is objectionable for the reason that a fixed rim structure which is adapted to receive one type of demountable rim is not adapted to receive any other and different type, and it is frequently difficult and inconvenient, and sometimes impossible to obtain the particular type of rim to which a fixed rim is adapted at a time and place where a rim is needed.

It is among the special purposes of my present invention to provide a fixed rim structure which is universal in its adaptation to receive and accommodate various types and forms of rims.

While I have shown and will describe my invention as applied to sheet steel disk wheels, it is to be understood that my invention is not to be limited or restricted in this respect as it is capable of being readily utilized in connection with wood and other types of wheels.

In the drawing, reference numeral 5 designates the fixed rim upon which a tire rim is to be demountably mounted. In the case of a disk wheel, the wheel, in one form, is made up of the disks 6, 7, and the fixed rim 5 is formed in an annular flange of one of the wheel disks. The fixed rim also exteriorly shaped to demountably receive thereon the rims which carry the tire.

In order to receive and accommodate various types of rims, the fixed rim 5 is formed with a plurality of annular shoulders successively arranged or disposed in its transverse width, and in the region of one edge thereof, namely, in the region at its free edge. In the structure shown in Figs. 1 and 2 two such annular shoulders 8, 9, are formed in the fixed rim said shoulders respectively adapted to form lateral bearing seats or shoulders against which a different type of rim may be demountably clamped. For instance, in Fig. 1, I have shown one type of rim 10 which is in common use and which is formed with a shoulder 11 on its interior surface, and which, in a structure embodying my invention, seats laterally and is clamped against the annular shoulder 8 of the fixed rim. In Fig. 2 I have shown another common type of wheel rim which is formed with an edge shoulder 12 and which, in a structure embodying my invention, seats against the annular shoulder 9 of the fixed rim.

Thus, by the structure shown, the same fixed rim will receive and accommodate various types of demountable rims.

The rim, whether of the one or another type, may be demountably clamped upon the fixed rim in various ways. I have shown an exceedingly simple and efficient structure wherein, after the rim is applied to the fixed rim and seated at one edge or side against one or another of the annular shoulders formed in the fixed rim, according to the type of rim, it is clamped in place by means of a retaining ring 13, which is applied against the other edge or side of the rim. This ring is detachably held in applied position by means of clips 14, carried by stud bolts 15 mounted in the wheel body adjacent the fixed rim, nuts 16 threaded onto the bolts 15 serving to clamp the parts together. The clips are formed with elongated openings 17 therethrough through which the bolts 15 extend. By backing off the nuts the clips are released and may then be displaced sufficiently to enable the retaining ring 13 to be removed thereby permitting the rim to be removed from the fixed rim and replaced thereon when necessary or required.

In case of a disk wheel, one of the disks may be formed with an annular shoulder 18, adjacent the mounting of the stud bolts 15, and this shoulder aids in retaining the clips 14 in clamping position when clamped up by the nuts 16.

It is the usual custom to construct demountable tire rims in the form of bands or rings suitably shaped on the outer surface thereof to receive the tires. Ordinarily the tire rims or bands are split transversely to facilitate the application thereto and removal therefrom of the tire. In the case of split rims it is the custom to apply interlocking lugs to the abutting ends of the split rim to prevent relative lateral displacement of said ends. These lugs usually are riveted to the inner surfaces of the split ends of the rim. They are not usually of uniform size or location in the various types and forms of rims, and hence each type or form of rim requires a fixed rim with a depression transversely across its exterior surface to receive and accommodate the lugs of the particular form of rim to which it is adapted.

It is also among the special purposes of my present invention to provide a fixed rim structure which is adapted to receive and accommodate detachable split tire rims whatever may be the size or location of the interlocking lugs at the ends thereof. In carrying out this feature of my invention I construct the fixed rim with a plurality of seats or depressions to extend transversely partially across the exterior surface thereof, to respectively different transverse distances and of respectively different sizes or areas.

Referring to Figs. 4 to 12, the rim ends 20, 21, have the interlocking lugs 22, 23, applied to the inner surfaces thereof. To accommodate these lugs and permit the quick and easy application of the demountable rim to and its removal from the fixed rim, whatever may be the size and relative location of said lugs, I form the fixed rim with a plurality of transversely disposed seats or depressions two of which are shown at 24, 25, of relatively different distances transversely across the exterior surfaces of the fixed rim, and of relatively different areas, and at various points around the periphery of the fixed rim. These seats or depressions may be conveniently pressed into the exterior surface of the fixed rim by suitable die operations in any suitable manner. It will be understood, of course, that in mounting a rim upon the fixed rim the particular seat or depression 24, 25, will be selected to accommodate the particular tire rim employed. It will be seen by comparing Figs. 6 and 7 that the seats or depressions 24, 25 extend relatively different distances across the fixed rim from one edge thereof towards the other edge, and the depressions are of relatively different dimensions as clearly indicated in Fig. 4.

From the foregoing description it will be seen that I provide an exceedingly simple, economical and efficient fixed rim structure in which various types or forms of rims may be received and accommodated, and demountably mounted thereon.

Having now set forth the objects and nature of my invention, and a construction embodying the principles thereof, what I claim as new and useful and of my own invention and desire to secure by Letters Patent is:—

1. In a demountable rim structure for disk wheels, a wheel disk having a hub portion and a fixed rim member said fixed rim member having transverse depressions, means to receive different types of rims, and means for clamping the rims upon said fixed rim.

2. In a demountable rim structure for metal disk wheels, a wheel disk having a fixed rim member, said fixed rim member having transverse depressions, a plurality of seating portions in its exterior surface, and respectively adapted to receive different types of rims thereagainst, and means to clamp the rims against said seating portions.

3. In a demountable rim structure for metal disk wheels, a wheel disk having a fixed rim member, said fixed rim member having transverse depressions, a plurality of seating surfaces adjacent one edge thereof and respectively adapted to receive thereagainst a different type of rim, and means to clamp the rims against said seating surfaces.

4. In a demountable rim structure for metal disk wheels, a wheel disk having a fixed rim member, said fixed rim member having transverse depressions, a plurality of seating surfaces disposed in the transverse width of the exterior surface thereof, respectively adapted to receive thereagainst tire rims of different types, and means to detachably clamp the tire rims against said seating surfaces.

5. In a demountable rim structure for metal disk wheels, a wheel disk having a hub portion and a fixed rim member, said fixed rim member having transverse depressions, a plurality of annular shoulders formed in the exterior surface thereof and disposed in successive order in the transverse width of said fixed rim to respectively receive thereagainst tire rims of different types, and means to detachably clamp the tire rims against said shoulders.

6. In a demountable rim structure for disk wheels and in combination with a fixed rim having at one edge thereof rim seats, a retaining ring member applied at and supported upon the opposite edge of the fixed rim to form a cooperating rim seat, removable clips to engage said ring member and detachably clamp the same against the rim to clamp and hold the latter against the fixed rim, the wheel body having an annular shoulder to assist in retaining the clips in clamping position.

7. In a demountable rim structure for wheels, a wheel having a fixed rim member, said fixed rim member having a plurality of seats or depressions extending transversely partially across the exterior surface thereof and to relatively different distances thereacross.

8. In a demountable rim structure for wheels, a wheel having a fixed rim member, said fixed rim member having a plurality of seats or depressions extending transversely partially across the exterior surface thereof and to relatively different distances thereacross and of relatively different areas.

9. In a demountable rim structure for wheels, a wheel having a fixed rim member, said fixed rim member having a plurality of annular seating shoulders and a plurality of transversely disposed depressions or seats in the exterior surface thereof.

10. In a demountable rim structure for wheels, a wheel having a fixed rim member, said fixed rim member having a plurality of seats or depressions extending transversely partially across the exterior surface thereof and to relatively different distances thereacross and clamping seats or shoulders annularly disposed in the exterior surface thereof.

11. In a demountable rim structure for metal disk wheels, a wheel disk having a fixed rim member formed with sets of seats depressed therein below and extending transversely partially across the annular surface thereof to different distances.

12. In a demountable rim structure for metal disk wheels, a wheel disk having a fixed rim member with inclined rim seating surface to receive said demountable rim, depressions transversely across said fixed rim at spaced intervals, and means for securing said rim.

In testimony whereof I have hereunto set my hand on this 21st day of March A. D., 1921.

WILLIAM BARBER.